May 11, 1943.  J. C. HARRIS  2,319,060
DRIER
Filed Aug. 3, 1940  3 Sheets-Sheet 1
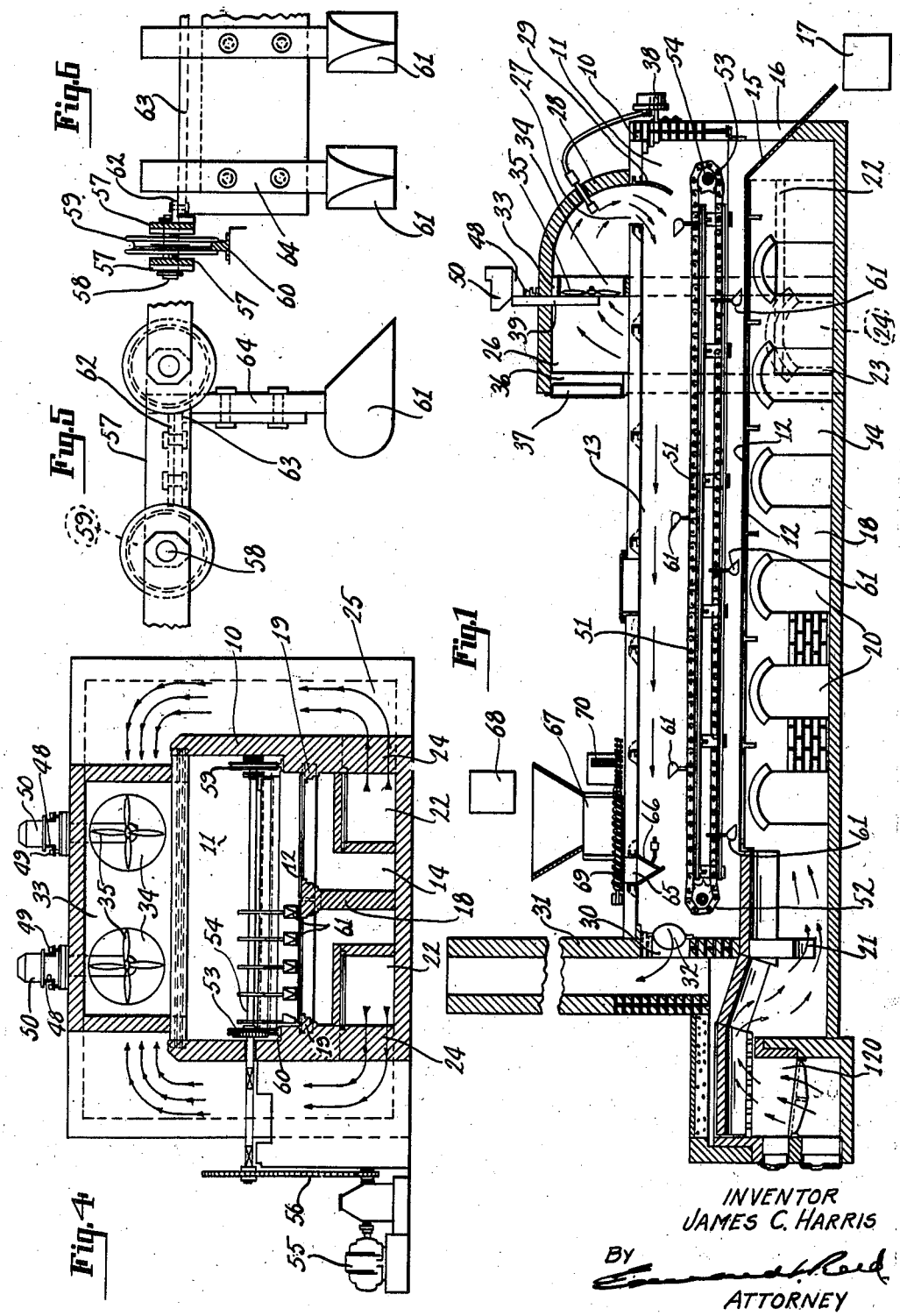
INVENTOR
JAMES C. HARRIS
By
ATTORNEY May 11, 1943.   J. C. HARRIS   2,319,060
DRIER
Filed Aug. 3, 1940   3 Sheets-Sheet 2
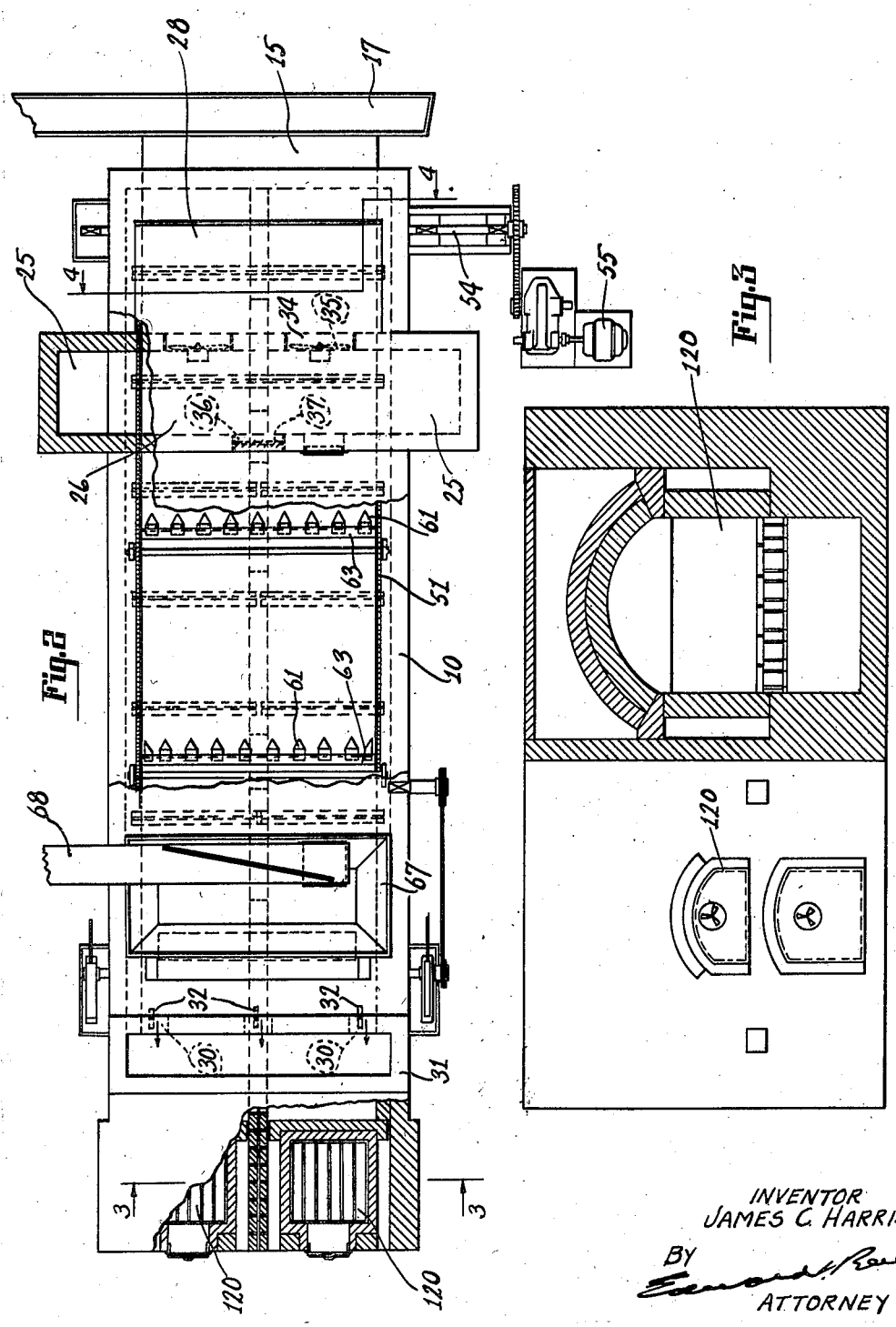
INVENTOR
JAMES C. HARRIS
BY
ATTORNEY

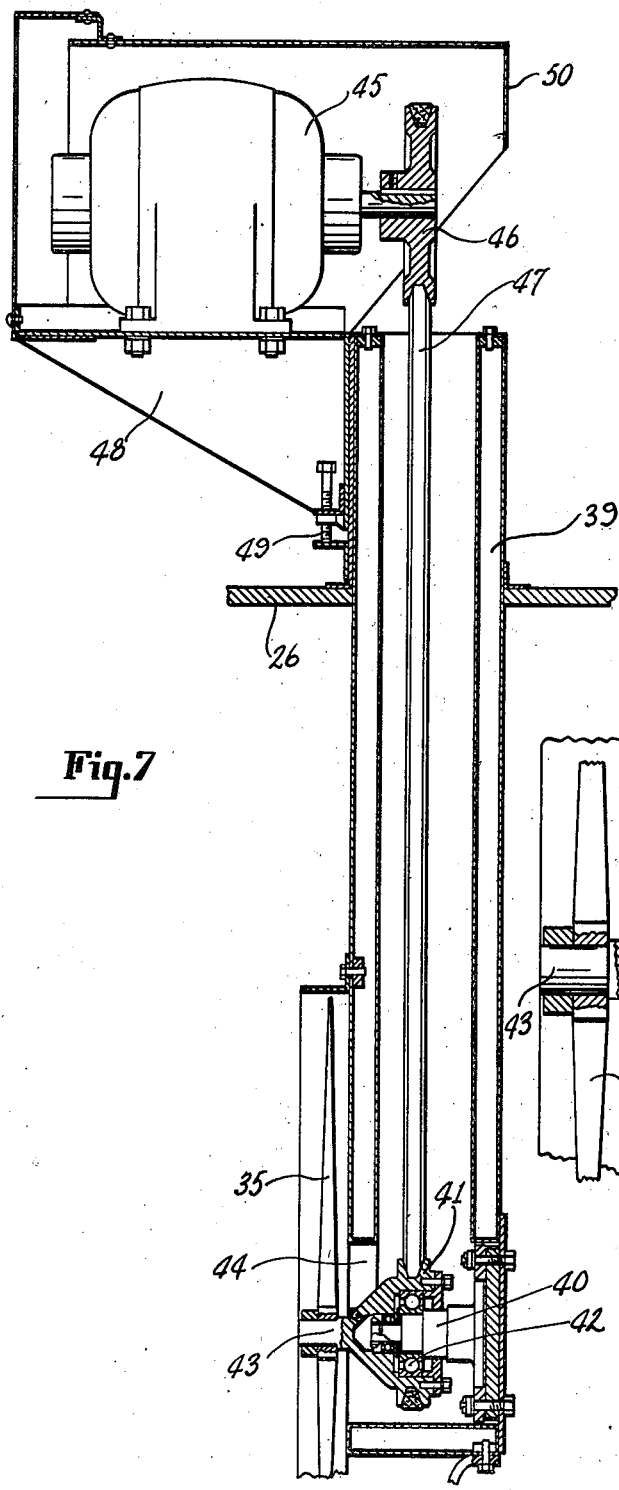

Patented May 11, 1943

2,319,060

UNITED STATES PATENT OFFICE 2,319,060

DRIER

James C. Harris, Erie, Pa., assignor to The Manufacturers Equipment Company, Dayton, Ohio, a corporation of Ohio Application August 3, 1940, Serial No. 351,322

2 Claims. (Cl. 34—181)

This invention relates to a drier and is designed more particularly for removing all or a desired part of the moisture from materials which in their raw state are more or less plastic in character, such as clay, shale and the like. The conditions under which materials of this kind must be dug or mined are frequently such that the material contains so large an amount of moisture as to render the processing of the same unprofitable. Various attempts have been made to provide means whereby such material could be uniformly and economically dried prior to the processing thereof but the apparatuses provided for that purpose have, for the most part at least, been unsatisfactory.

One object of the present invention is to provide a simple efficient apparatus for removing excess moisture from such materials while the materials are in their raw state, that is, prior to processing the same.

A further object of the invention is to provide such an apparatus which will effect uniform dehydration of all portions of the material treated.

A further object of the invention is to provide such an apparatus which may be so controlled as to evacuate moisture to the desired extent from materials of various kinds and containing various amounts of moisture, thus imparting to the apparatus a wide range of service and great flexibility.

A further object of the invention is to provide such an apparatus which will have a large capacity and may be operated at a low cost.

Other objects of the invention may appear as the apparatus is described in detail.

In the accompanying drawings Fig. 1 is a section taken longitudinally through an apparatus embodying the invention and partly broken away, looking in the direction of the arrows; Fig. 2 is a top plan view of such an apparatus, partly broken away; Fig. 3 is a rear elevation of the apparatus, partly in section on the line 3—3 of Fig. 2; Fig. 4 is a section on the line 4—4 of Fig. 2; looking in the direction of the arrows; Fig. 5 is a detail side elevation of one of the feeding and agitating devices; Fig. 6 is a detail view showing two of said feeding and agitating devices in front elevation; Fig. 7 is a sectional detail view of the mounting and operating means for one of the fans; and Fig. 8 is a sectional detail view taken centrally through the fan bearing.

In these drawings I have illustrated one form of apparatus embodying my invention but it will be understood that this particular embodiment has been chosen for the purpose of illustration only and that the apparatus may take various forms without departing from the spirit of the invention.

In the embodiment illustrated the apparatus comprises an elongate structure or housing 10 of masonry or other suitable heat resisting material, said housing having therein a chamber 11 extending for substantially the full length thereof. A substantially horizontal partition 12 divides the chamber 11 into upper and lower passageways, 13 and 14, through which a drying medium may be circulated, and also constitutes a support over which the material to be dried may be moved. At its forward or discharge end the partition is provided with a chute 15 which extends through an outlet 16 in the end wall of the housing 10 and serves to discharge the dried material exteriorly of the housing where suitable means, such as a trough 17, may be provided to receive the same. The partition 12 is preferably of heat conducting material which will transfer the heat from the drying medium in the lower passageway 14 to the material on the partition and may conveniently be formed of one or more plates of cast iron. When the chamber 11 is of substantial width it may be desirable to provide an intermediate support for the partition, such as a longitudinal upright wall 18 which divides the lower passageway into two parts. As shown in Fig. 4 the partition 12 comprises plates supported at their inner edges on the partition 18 and at their outer edges on ledges 19 on the side walls of the housing. The wall 18 is preferably provided with a series of openings 20 to connect the two parts of the lower passageway and maintain a substantially uniform distribution of the drying medium throughout the width of that passageway.

A heated gaseous drying medium is circulated through the lower passageway 14, in contact with the partition 12, for substantially the full length of that partition and is then transferred to the upper passageway 13 and circulated in a reverse direction through that passageway. The drying medium may be derived from any suitable source but preferably the apparatus is provided at that end opposite the material outlet 16 with a combustion chamber 120, the heated air and other products of combustion from which are delivered to the adjacent end of the lower passageway 14 through an inlet 21. The combustion chamber 120 is here shown as part of a coal furnace and a separate furnace is provided for each part of the lower passageway. It will be understood, however, that the combustion chamber may be adapted to burn fuel of any suitable kind and that any suitable number of combustion chambers may be employed.

Arranged within the forward part of the lower passageway 14 is a conduit, or conduits, 22, there being in the present instance two of these conduits arranged adjacent the respective sides of the lower passageway. Each conduit is closed at its rear end, as shown at 23, and has its forward end open and spaced some distance from the end wall 10 of the housing 10. Adjacent its closed end each conduit is provided with a lateral opening 24 which leads to an upright conduit 25 arranged exteriorly of the housing 10 and extending above the upper passageway of the housing. At its upper end each of these upright conduits 25 communicates with a substantially horizontal conduit 26 supported above the upper passageway, and in the present instance on the top of the housing 10, and communicating at its forward end with the upper passageway 13 through an opening 27. The front wall 28 of the conduit 26 is curved downwardly to the top wall of the housing 10 just beyond the opening 27 and a curved plate 29 extends into the upper passageway in line with the curved wall 28, the wall and plate constituting a deflector which directs the drying medium rearwardly through the upper passageway to outlets 30 leading to a stack 31, these outlets being provided with suitable means for controlling the flow of the drying medium through the same, such as butterfly dampers 32. Any suitable means may be provided for circulating the drying medium through the passageways and conduits but preferably fans are mounted in the horizontal conduit 26, and, as here shown, that conduit is provided with an upright transverse partition 33 provided with openings 34 in which fans 35 are mounted. It is also desirable that means should be provided for mixing atmospheric air with the drying medium to control the temperature and volume of the latter as it is delivered to the upper passageway. For this purpose the horizontal conduit 26 is provided at its rear end with an air inlet 36, the flow of air through which is controlled by adjustable louvers 37. The fans 35 are operated at the desired speed to draw the drying medium from the lower passageway through the conduits and deliver the same to the upper passageway with sufficient velocity to cause it to circulate through the upper passageway and in contact with the material on the partition. The louvers 37 are adjusted to admit air in such quantities as will impart to the drying medium the desired temperature and volume. If desired, a thermometer 38 may be mounted in the forward portion of the conduit 26 to indicate the temperature of the drying medium as it enters the upper passageway.

The fans may be mounted and operated in any suitable manner. As here shown, a tubular supporting structure 39 is provided for each fan and this structure extends through the top wall of the conduit 26 and has mounted in its lower end a stud 40 on which a fan pulley 41 is rotatably mounted by means of ball bearings 42. This pulley has a stud 43 which extends outwardly through an opening 44 in one wall of a tubular element 39 and on which the fan 35 is rigidly mounted. A motor 45 is supported above the conduit 26 and provided with a drive pulley 46 which is connected with the fan pulley 41 by a belt 47 which extends through the tubular supporting element 39. The motor may be mounted in any suitable manner but, as here shown, it is carried by a bracket 48 mounted on the tubular supporting element 39 and vertically adjustable with relation thereto, as by an adjusting screw 49. The motor is enclosed in a housing 50, a portion of which is cut away above the tubular element 39 to permit air to circulate through the tubular element and through the opening 44 to cool the bearing and other parts of the fan structure.

Any suitable means may be provided for moving the material to be dried over the supporting partition 12 and for agitating the same during such movement. In the construction here shown endless chains 51 are mounted at the respective sides of the upper passageway 13 and are supported adjacent the respective ends of the passageway by sprocket wheels 52 and 53. The sprocket wheels 53 are mounted on a shaft 54 which extends to the exterior of the housing 10 and is driven from a motor 55 by means of a sprocket chain 56. Each chain preferably comprises a plurality of pairs of parallel links 57, the adjacent pairs of links being pivotally connected one to the other by pivot pins 58 on which are mounted rollers 59 which travel over tracks 60 supported by the side walls of the housing 10. Carried by these chains are devices 61 which serve both to progressively advance the material over the partition 12 and to agitate the same as it is so advanced. As here shown these devices are in the form of plows which are moved through the material and serve to turn the same over on each side of the furrow formed by the plow. These plows may be connected with the chains in any suitable manner but, in the construction shown, certain of the inner links of the chains are provided with inwardly extending flanges 62 and angle bars 63 are rigidly secured at their ends to flanges of the corresponding links of the two chains. Each plow has rigidly secured thereto a shank 64 which in turn is rigidly secured to the vertical flange of the angle bar 63. A plurality of plows are secured to each cross bar and the plows of each series are arranged in staggered relation to the plows on each adjacent series, so that all parts of the material on the partition will be turned over and agitated as the material is advanced. The plows of each series are spaced apart such a distance that forward movement will be imparted to the material simultaneously with the turning of the same and by regulating the speed at which the conveyor, consisting of the chains and plows, is operated the movement of the material may be regulated according to the drying requirements.

The material to be dried may be delivered to the partition 12 in any suitable manner and, in the present apparatus, the housing is provided adjacent the stack 31, with an inlet opening 65 which is normally closed by a weighted door 66. As the material passes through this inlet the door is held in contact therewith so as to prevent the escape of the drying medium through the inlet opening. Mounted on the top wall of the housing adjacent the inlet opening is a hopper 67 to which the material is supplied through a chute 68 and from which it will be delivered to the inlet opening 65 in any suitable manner, as by means of a screw conveyor 69 driven by a motor 70.

While I have shown and described one form of apparatus for performing my method of drying I wish it to be understood that I do not desire to be limited to the details thereof as various modifications may occur to a person skilled in the art.

Having now fully described my invention, what I claim as new and desire to secure by Letters Patent, is:

1. In a drier, a structure having an elongate chamber, a substantially horizontal partition dividing said chamber into upper and lower passageways, and constituting a support for material to be dried, said upper passageway having near one end thereof an inlet for said material and near the other end an outlet for said material, a source of heated gases communicating with the end of said lower passageway adjacent said material inlet, an outlet for said gases at that end of said upper passageway adjacent the inlet for said material, means for agitating material on said partition and moving the same forwardly toward said material outlet, a conduit arranged within and communicating with said lower passageway near the forward end thereof, an exterior conduit connected with the first mentioned conduit and extending above said upper passageway, a third conduit arranged above said upper passageway, connected with said exterior conduit and extending forwardly therefrom to a point near the forward end of said upper passageway, said upper passageway having in a wall thereof an opening through which the forward end of said third conduit communicates therewith, a fan in said third conduit to draw gases from said lower passageway and deliver the same to said upper passageway, a tubular support for said fan extending through a wall of said third conduit, a motor mounted on said wall, and driving connections between said motor and said fan arranged within said tubular support, said tubular support having openings near the ends thereof to permit the circulation of air therethrough.

2. In an apparatus for removing moisture from material to be dried, a structure having a chamber, a substantially horizontal partition dividing said chamber into upper and lower passageways and constituting a support for the material, said upper passageway being provided near one end thereof with an inlet for said material and near the other end thereof with an outlet for said material, means for agitating the material on said partition and moving the same forwardly toward said outlet, a conduit communicating with the lower passageway near the forward end of the latter and extending upwardly therefrom, a second conduit arranged above said upper passageway, communicating at one end with said upper passageway and connected at its other end with the first mentioned conduit, a fan arranged in said second conduit to draw gases from said lower passageway and deliver the same to said upper passageway, a tubular support for said fan extending through a wall of said second conduit, a motor mounted on said wall, and means arranged in said tubular support to drivingly connect said motor with said fan, said tubular support having openings near the inner and outer ends thereof to permit air to circulate therethrough.

JAMES C. HARRIS.